United States Patent

[15] 3,691,547

Lipscomb

[45] Sept. 12, 1972

[54] METER READING SYSTEM HAVIN DIGITAL ENCODER

[72] Inventor: George Winfred Lipscomb, Raleigh, N.C.

[73] Assignee: Westinghouse Electric Corporation, Pittsburgh, Pa.

[22] Filed: Oct. 30, 1970

[21] Appl. No.: 85,514

[52] U.S. Cl. .................... 340/204, 340/183, 200/5
[51] Int. Cl. ........................ G08c 19/28, G08c 9/08
[58] Field of Search ........................... 340/204, 188

[56] References Cited

UNITED STATES PATENTS

| | | | |
|---|---|---|---|
| 2,766,446 | 10/1956 | Bland | 340/188 |
| 2,880,410 | 3/1959 | Postman | 340/204 |
| 2,923,925 | 2/1960 | Dickinson | 340/204 |
| 3,032,752 | 5/1962 | Welch | 340/204 |
| 3,046,534 | 7/1962 | Constant | 340/188 |
| 3,274,584 | 9/1966 | Morgan | 340/188 |
| 3,430,217 | 2/1969 | Bridge | 340/204 |

Primary Examiner—Thomas B. Habecker
Attorney—A. T. Stratton and C. L. Freedman

[57] ABSTRACT

Pulses from a watt-hour meter pulse transmitter are supplied to an electric motor having a rotation controller which includes control tracks and brushes. This controller causes the motor to operate for a definite angular rotation for each received pulse. Rotation of the motor shaft supplies an input to an analog-to-digital converter. The converter has two segmented tracks and two brushes which provide a two-out-of-four code. A scanning device has scan contacts connected to the segments of the tracks for transmitting coded information from the converter to a receiving station. The scanning device may interrogate sequentially a number of similar converters. The controller scanning device and converter have components printed on a common printed-circuit board.

7 Claims, 3 Drawing Figures

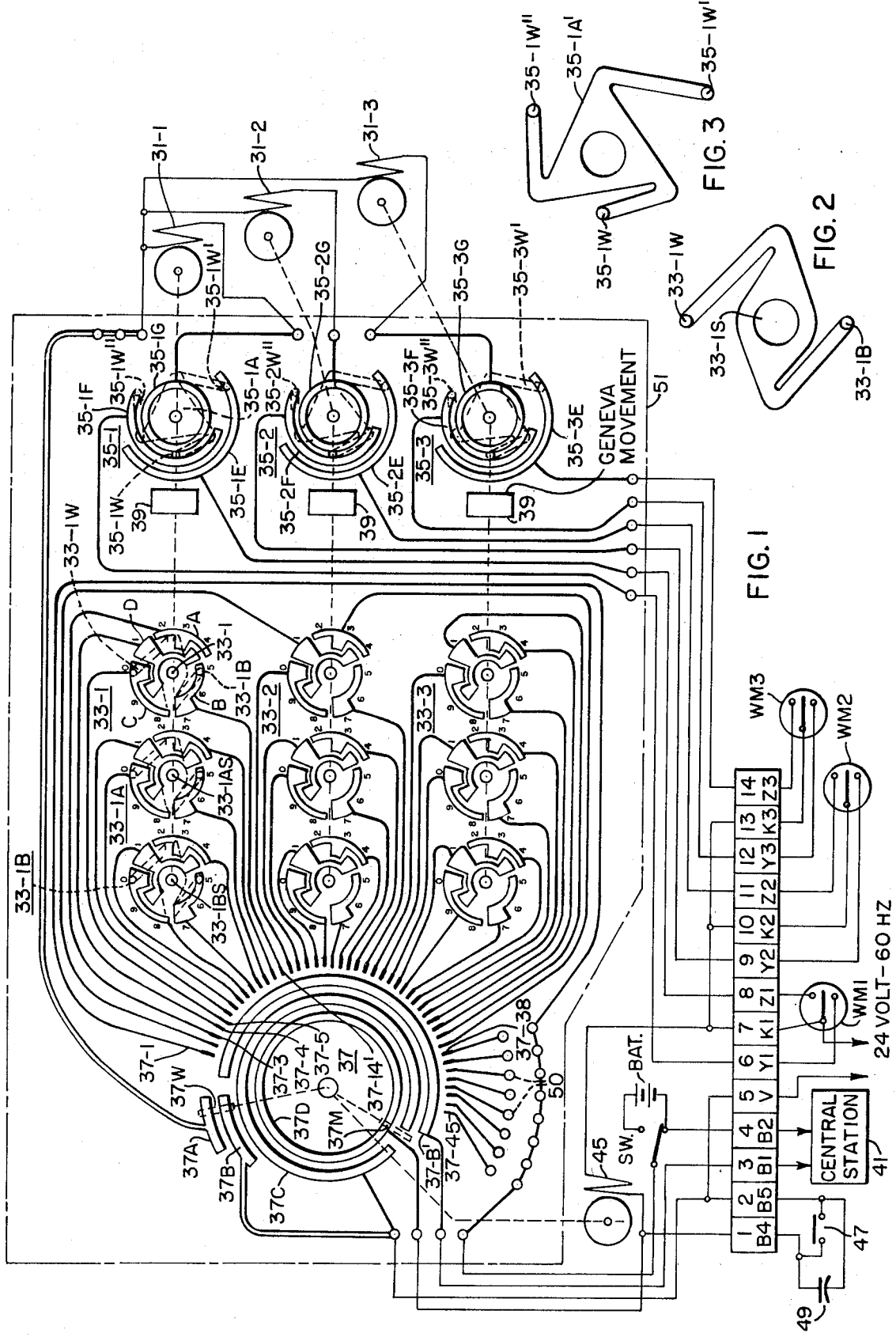

METER READING SYSTEM HAVIN DIGITAL ENCODER

CROSS REFERENCES TO RELATED APPLICATIONS

In my copending patent application Ser. No. 802,534, filed Feb. 26, 1969, a motor is controlled by pulses from a watt-hour meter to operate a remote register.

BACKGROUND OF THE INVENTION

1. Field of the Invention

The invention relates to a measurement transmitting system and it has particular relation to such a system wherein analog-to-digital converters are employed for transmitting information from watt-hour meters having pulse transmitters.

2. Description of the Prior Art

In automatic meter reading it is desired to obtain at a central station the dial readings of a remote meter automatically without the necessity of sending a meter reader to the location of the remote meter. To this end it has been proposed that that the meter be equipped with a pulse transmitter and that pulses derived from the transmitter be converted to an analog-to-digital converter providing a binary output suitable for transmission to a remote central station. The binary output may be transmitted over various channels such as a telephone system. In some cases the analog-to-digital converter is mechanically coupled to the rotor of a meter. An example of such a system will be found in the U.S. Pat. No. 3,299,423.

SUMMARY OF THE INVENTION

In accordance with the invention, analog information from a meter is converted into a binary code by means of an analog-to-digital converter. With two tracks made of conductive segments and two brushes, the converter operates on a two-out-of-four code.

The analog input to the converter is derived from a meter in a suitable manner. Preferably, the meter includes a pulse transmitter. For each pulse a converter operating motor is controlled to rotate through a predetermined angular movement.

A scanning device sequentially scans each segment of each converter employed in the system. The scanning devices provide output pulses which may be transmitted to a central station in any suitable manner as by means of a telephone line.

Components of the converters, the controllers, and the scanning device are printed on a common printed-circuit board.

BRIEF DESCRIPTION OF THE DRAWINGS

For a better understanding of the invention reference may be had to the preferred embodiment exemplary of the invention shown in the accompanying drawing in which:

FIG. 1 is a schematic view with parts shown in plan of a meter reading system embodying the invention; and FIGS. 2 and 3 are views in plan of contact brush assemblies suitable for the system of FIG. 1.

DESCRIPTION OF THE PREFERRED EMBODIMENT

The system may be arranged to transmit readings from any desired number of meters. For illustrative purposes it will be assumed that readings are to be transmitted from three meters WM1, WM2 and WM3. The meters may be designed to measure any variable quantity such as water, gas or electricity.

For present purposes it will be assumed that all of the meters are watt-hour meters equipped with pulse transmitters. Conventional pulses transmitters may be of the two-wire type or the three-wire type which are sometimes referred to as impulse transmitters. Thus, the watt-hour meter WM1 has a movable contact connected to a terminal K1, a first fixed contact connected to terminal Z1, and a second fixed contact connected to a terminal Y1. The movable contact is shown in an upper position wherein it connects the terminals K1 and Z1. After it moves to this position, the movable contact remains in the illustrated state until a predetermined amount of electric energy is thereafter measured by the watt-hour meter WM1, whereupon the movable contact moves to a lower position wherein it connects the terminals Y1 and K1. The movable contact remains in the lower position until the meter WM1 again measures the predetermined amount of electric energy whereupon the movable contact returns to its upper position. The watt-hour meter WM2 is associated similarly with contacts Y2, K2 and Z2 and the watt-hour meter WM3 is associated similarly with terminals Y3, K3 and Z3.

Pulses from the meters WM1, WM2 and WM3 effect rotation of motors 31-1, 31-2 and 31-3. The motors in turn, respectively control analog-to-digital converters 31-1, 33-2 and 33-3. Inasmuch as each meter is similarly related to its associated motor and converter, it will suffice to discuss the association of the meter WM1 with the motor 31-1 and the converter 33-1.

Operation of the meter WM1 effects the connection of the winding of the motor 31-1 to the terminals V and K1 across which a source of alternating voltage is connected. For illustrative purposes it will be assumed that the source of alternating voltage is a 24 volt source having a frequency of 60 Hertz.

For each contact movement of the meter WM1 the extent of movement of the motor 31-1 is determined by a supervising or controlling device 35-1 which has three concentric electroconductive tracks. The innermost track is a continuous ring or track 35-1G. The intermediate track 35-1F and the outermost track 35-1E extend slightly more than 180° about the axis of the concentric tracks.

The motor 31-1 rotates a wiper or brush assembly 35-1A having three wipers or brushes 35-1W, 35-1W' and 35-1W''. Conveniently the assembly may be cut from a sheet of electroconductive spring bronze having a thickness of 0.004 inch. By inspection of FIG. 3 it will be noted that the sheet is cut to form a central hole for reception of the drive shaft and three flexible fingers which terminate in the wipers or brushes. EAch finger is bent towards it associated track to provide a wiping engagement with the tracks. The wiper 35-1W is in continuous engagement with the continuous track 35-1G. The wipers 35-1W' and 35-1W'' respectively engage the tracks 35-1E and 35-1F for slightly more than 180° of travel.

The controlling device 35-1 controls its associated motor to make one-half revolution for each change in state of the contacts of the watt-hour meter WM1. Let it be assumed that the parts are in the conditions illustrated in FIG. 1 and that thereafter the movable contact of the watt-hour meter 1 changes state to engage the lower fixed contact. The motor 31-1 is now connected to the 24 volt, 60 Hertz source of voltage through a circuit which may be traced from the power-source terminal K1 through the lower fixed contact of the watt-hour meter WM1, the terminal Y1, the track 35-1F, the brushes or wipers 35-1W″ and 35-1W, the track 35-1G, the winding of the motor 31-1, a short electroconductor track 37A of a scanning device 37, a brush or wiper 37W, and a track 37B of the scanning device 37 to the second terminal V of the voltage source.

The motor 31-1 now rotates in a counterclockwise direction for 180°. Continued rotation of the motor moves the brush 35-1W″ away from the track 35-1F to interrupt the energizing circuit for the motor 31-1. At the same time, the brush 35-1W′ engages the track 35-1E to connect this track to the track 35-1G.

When the contacts of the watt-hour meter WM1 again change state to return to the condition illustrated in FIG. 1, an energizing circuit for the motor 31-1 is completed which may be traced from the power source terminal K1 through the contacts of the watt-hour meter WM1, the terminal Z1, the track 35-1E, the brushes 35-1W′ and the 35-1W, the track 35-1G, the winding of the motor 31-1, the track 37A, the brush 37W, and the track 37B to the second terminal V of the power source. The motor now rotates for 180° in a counterclockwise direction. At this point, the brush 35-1W′ leaves the track 35-1E to interrupt the energizing circuit for the motor and the brush 35-1W″ engages the track 1F to prepare for a subsequent energization of the motor. In this way, each change in state of the contacts of the watt-hour meter WM1 causes the motor 31-1 to rotate 180°.

Each revolution of the motor 31-1 rotates a shaft 33-1S of the converter 33-1 for one-tenth of a revolution about its axis. Preferably, this movement of the shaft is by a step or jump action produced in a conventional matter as by Geneva gearing 39. The shaft 33-1S is constructed of electro-conductive material and has secured thereto two electro-conductive fingers of spring material which terminate in brushes or wipers 33-1W and 33-1B. The brush 33-1W is spaced from the shaft 33-1S by a distance greater than that of the brush 33-1B. Consequently, as a shaft rotates, the brushes follow two concentric tracks.

The stepping action of the shaft 33-1S causes the brush 33-1W to step successively to quantized positions which are labeled 0 to 9 in FIG. 1. Each of these steps may be calibrated to represent a certain number of kilowatt hours of energy measured by the watt-hour meter WM1. For present purposes, it will be assumed that a position of the brush 33-1W represents units of kilowatt hours.

In order to convert the analog represented by the position of the shaft 33-1S into a binary code suitable for transmission to a receiving station, the brushes 33-1W and 33-1B are arranged to connect electro-conductive segments A, B, C and D to a common circuit through the shaft 33-1S. If a segment is not so connected by a brush, it may be said to have a zero-bit level. If a contact segment is so connected by a brush, it may be said to have a one-bit level. The levels of the segments for the 10 positions of the shaft 33-1S are shown in the following table:

TABLE I

| position of Brush 33-1W | Level of Segments | | | |
|---|---|---|---|---|
| | A | B | C | D |
| 0 | 0 | 1 | 1 | 0 |
| 1 | 0 | 1 | 0 | 1 |
| 2 | 1 | 1 | 0 | 0 |
| 3 | 1 | 0 | 0 | 0 |
| 4 | 1 | 0 | 0 | 1 |
| 5 | 0 | 0 | 1 | 0 |
| 6 | 0 | 0 | 0 | 1 |
| 7 | 0 | 1 | 0 | 0 |
| 8 | 1 | 0 | 1 | 0 |
| 9 | 0 | 0 | 1 | 1 |

With the shaping of the segments shown in FIG. 1, it is possible to obtain the levels called for by the Table with only two brushes 33-1W and 33-1B, which may be constructed from sheet electroconductive material in the same manner discussed for the brushes 35-1W to 35-1W‴. These segments are arranged to be scanned or interrogated by the scanning device 37. To this end, the scanning device is provided with 45 contacts 37-1 through 37-45 which are arranged in a row or track to be connected successively by the brush 37W to an arcuate electro-conductive track 37B′. It will be noted that the tracks 37B and 37B′ have the same radius relative to the axis of the scanning device 37 but are spaced angularly from each other. It will be noted further that the track 37A and the contacts 37-1 to 37-45 have the same radius but are spaced from each other.

During a clockwise revolution the brush engages the contact 37-1 to initiate a control operation, such as to enable or synchronize apparatus at the central station which may comprise a decoder.

By inspection of FIG. 1, it will be noted that the segments A, B, C and D of the converter 33-1 are connected respectively to the contacts 37-3, 37-14, 37-5 and 37-4. Thus, for each clockwise revolution of the brush 37W, the segments A, D, C and B of the converter 33-1, are connected successively through the brush 37W and the track 37B′ to a first output terminal B1. The second output terminal, B2, may be connected to components such as the shaft 33-1S through a single-pole, double-throw switch SW. The output from the output terminals B1 and B2 may be transmitted in any suitable manner as over telephone lines to a central or receiving station 41. Thus, during each interrogation or scanning operation, each contact segment having a one-bit level effects a contact closure across the output terminals B1 and B2. The central station may be arranged to respond to such contact closure.

If a definite voltage is desired for the purpose of representing a one-bit level, the switch SW may be operated to its second position wherein a battery BAT is connected in the circuit across the output terminals B1 and B2. With this arrangement a definite voltage is applied to the central station for each interrogated segment having a one-bit level.

The central station may handle all the information supplied thereto in various ways. For example, it may contain a recorder for recording the information supplied to it from the output terminals B1 and B2. Alternatively, the central station may have a computer for totalizing or otherwise computing the information supplied thereto. Such equipment is well known in the art.

The converter 33-1 is followed by a "tens" converter 33-1A and a "hundreds" converter 33-1B all of similar construction. These converters are so coupled for that each revolution of the shaft 33-1S, the shaft 33-1AS of the converter 33-1A rotates one-tenth of a revolution and for each revolution of the shaft 33-1AS the shaft 33-1BS of the converter 33-1B rotates one-tenth of a revolution. It will be understood that inasmuch as the shafts of the higher-order converters are driven by the step or jump action shaft of the units converter all of the shafts are operated in steps. By inspection of FIG. 1, it will be noted that the segments of each of the higher-order converters are connected to separate contacts of the group of contacts 37-1 to 37-45.

Each of the converters 33-2 and 33-3 is similar in construction to the converter 33-1 and each is similarly followed by two higher-order converters. Each segment of each of the converters is connected to a separate contact of the group 37-1 to 37-45. The converters 33-2 and 33-3 are operated by the motors 31-2 and 31-3, respectively, under the control of the watt-hour meters WM2 and WM3 in a manner similar to the operation of the converter 33-1 by the motor 31-1 under the control of the watt-hour meter WM1.

The wiper 37W is rotated relative to its associated tracks and contacts by a scan motor 45. One terminal of the winding of the scan motor is connected to one terminal K1 of the 24 volt, 60 Hertz source of power. The remaining terminal of the scan motor 45 is connected to the remaining terminal V of the source of power through either a pushbutton switch 47 or a set of contacts 49. When a scanning or interrogation operation is desired the contacts 49 may be closed from the central station for a short time such as 2 seconds in a manner well understood in the art.

When the scan motor is started it rotates a wiper 37M relative to two concentric electro-conductive tracks 37C and 37D for the purpose of maintaining the scan motor in operation for approximately one revolution. The track 37D is a continuous ring and is connected to the terminal B4. The track 37C is continuous except for a small gap within which the wiper 37M is located when the scan motor 45 is at rest. The track 37C is connected to the terminal B5.

Upon closure of the switch 47 or the contacts 49 the scan motor 45 starts to rotate. After a few degrees of rotation, the wiper 37M bridges the tracks 37C and 37D and through the tracks bridges the terminals B4 and B5. This bridging acts to bridge the switch 47 or the contacts 49 which then may be released. The scan motor continues in operation until the wiper 37M is again located in the gap provided in the track 37C.

Several of the contacts 37-38 to 37-45 are provided for identification purposes. Selected ones of these contacts may be connected by suitable detachable links 50 through the switch SW to the terminal B2 for the purpose of identifying the specific meter or meters being interrogated by the scan motor 45.

The tracks 35-1E, 35-1F and 35-1G of the controlling device 35-1, and the similar tracks for the remaining controlling devices together with the tracks 37A, 37B, 37B', 37C and 37D of the scanning device, and the segments of the converters together with leads for the track and converter segments are all preferably formed of electro-conductive material printed on a board 51 of insulating material.

To illustrate the operation of the system, it will be assumed that following an interrogation or scanning operation, the watt-hour meters continue in operation. Each impulse from one of the watt-hour meters advances an associated converter one unit in the manner previously described.

When a scanning operation is desired, the contacts 49 are closed to energize the scan motor 45. This initiates rotation of the wipers 37W and 37M which will be assumed to rotate in a clockwise direction as viewed in FIG. 1. The wiper 37M promptly bridges the tracks 37C and 37D to shunt the contacts 49 and these contacts then may be released without stopping the scan motor 45. On continued movement of the scan motor 45, the wiper 37W successively engages the contacts 37-1 to 37-38. Each connection of the wiper 37W with one of these contacts which is connected to the terminal B2 provides a contact closure or one bit which is transmitted to the central station or recorded as desired. It will be recalled that the information transmitted from selected contacts 37-38 to 37-45 identifies the meters which are being interrogated.

The scan motor continues in operation until the wiper 37M rides off the track 37C to interrupt the energization of the scan motor. After such interruption, the scan motor remains at rest until another interrogation or scanning is to be made.

It will be noted that the energization of the motors 31-1, 31-2 and 31-3 is effected through the tracks 37A and 37B and the wiper 37W When a scanning or interrogation operation is initiated, the wiper 37W runs off the tracks 37A and 37B before the converters are interrogated. Consequently, a converter cannot change state during its interrogation.

I claim as my invention:

1. In a system for transmitting measuring information, an analog-to-binary converter, said converter comprising a plurality of four separate conductive segment means arranged in a predetermined circumferential pattern in and between first and second circular tracks having conductive and non-conductive portions defining a sequence of ten quantized positions within each of said tracks, a like plurality of electric circuits each connected to a separate one of the conductive segment means and having a fixed relationship with the other electric circuits, first and second brushes associated respectively with the first and second circular tracks such that conductive segment means at said positions in said first track are solely contacted by said first brush and conductive segment means at said positions in said second track are solely contacted by said second brush, means fixedly connecting said first and said second brushes mechanically and in a common electrically conducting relationship, and means coupling said brushes for movement in unison between adjacent quantized positions of said tracks for establishing a sequence of different coded electrical conditions in said like plurality of electric circuits when said first and second brushes are moved to each of said quantized positions of the tracks, such that each of the electrical conditions has a different binary coded state provided solely by the relationship between said first and second brushes and said pattern of said conductive segment means.

2. A system as claimed in claim 1 wherein said tracks are concentric about an axis, said sequence of quantized positions includes 10 separate positions which are angularly displaced from each other about said axis, said brushes are movable about said axis and a shaft made of electro-conductive material carries said brushes in electrically conducting relationship with said shaft.

3. A system as claimed in claim 1 in combination with a second analog-to-binary converter similar to the first-named converter, and a scanner comprising a plurality of contacts, a separate electric connection connecting each of said contacts to a separate one of the conductive segments means, output terminal means, and scanning sequentially connecting said contacts to the output terminal means, said contacts, said conductive segment means and said electric connections comprising printed parts of a printed-circuit board and the binary coded states include a two-out-four code.

4. A system as claimed in claim 3 wherein said scanning means comprises an electric scan motor, switch means for starting said scan motor, and auxiliary means responsive to starting of said scan motor for continuing operation of the scan motor for a predetermined rotation, said auxiliary means comprising an arcuate conductive control track printed on said board, and control brush means coupled to said scan motor for operation over said control track.

5. A system as claimed in claim 3 in combination with input terminal means for each of said converters, first and second input electric motors for advancing respectively the brushes for the first and second converters, first and second supervising means for controlling the energization of the first and second motors to run for a predetermined angle of rotation when energized from the associated input terminal means, each of said supervising means comprising arcuate conductive track means printed on the board, and brush means movable over the arcuate conductive track means by rotation of the associated input electric motor.

6. A system as claimed in claim 5 wherein said scanning means comprises an electric scan motor, switch means for starting said scan motor, and auxiliary means responsive to starting of said scan motor continuing operation of the scan motor for a predetermined rotation, said auxiliary means comprising an arcuate conductive control track printed on said board, and control brush means coupled to said scan motor for operation over said control track.

7. A system as claimed in claim 1 in combination with input terminal means, an electric motor for advancing the brushes of the converter, supervising means for controlling the energization of the motor to run for a predetermined angle of rotation when energized from the associated input terminal means, said supervising means comprising arcuate conductive track means printed on a printed circuit board, and said conductive segment means being printed on said printed circuit board.

* * * * *